(12) United States Patent
Seibt et al.

(10) Patent No.: US 10,000,918 B2
(45) Date of Patent: Jun. 19, 2018

(54) TOILET SYSTEM FOR A LAVATORY OF A VEHICLE, LAVATORY OF A VEHICLE, AND AIRCRAFT WITH SUCH A LAVATORY

(71) Applicant: Airbus Operations GmbH, Hamburg (DE)

(72) Inventors: Christian Seibt, Hamburg (DE); Joerg Cremers, Hamburg (DE); Jens Wiebalck, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 250 days.

(21) Appl. No.: 14/946,251

(22) Filed: Nov. 19, 2015

(65) Prior Publication Data
US 2016/0145846 A1   May 26, 2016

(30) Foreign Application Priority Data
Nov. 20, 2014 (DE) .................. 10 2014 117 002

(51) Int. Cl.
*E03D 9/05* (2006.01)
*B64D 11/02* (2006.01)

(52) U.S. Cl.
CPC ................ *E03D 9/05* (2013.01); *B64D 11/02* (2013.01)

(58) Field of Classification Search
CPC .................................. E03D 9/05; B64D 11/02
USPC ............................................................. 4/348
See application file for complete search history.

(56) References Cited

FOREIGN PATENT DOCUMENTS

| DE | 10326340 A1 | 7/2004 |
|---|---|---|
| DE | 102007061255 A1 | 7/2009 |
| DE | 102012003008 A1 | 8/2013 |
| EP | 0931720 A2 | 7/1999 |
| GB | 1090269 A | 11/1967 |
| GB | 2138045 A | 10/1984 |

OTHER PUBLICATIONS

German Patent Office, German Search Report for German Patent Application No. 10 2014 117 002.4 dated Oct. 28, 2015.

*Primary Examiner* — Tuan N Nguyen
(74) *Attorney, Agent, or Firm* — Lorenz & Kopf, LLP

(57) ABSTRACT

A toilet system for a lavatory of a vehicle comprises a toilet bowl, a cladding assembly for cladding the toilet bowl, forming a hollow space between the toilet bowl and cladding assembly, and a ventilation device with at least one suction line for extracting air. The cladding assembly extends from an exterior side of the toilet bowl over an edge of the toilet bowl, and thereby partially encases the edge. At least one of the at least one suction lines is fluidically connected with the hollow space.

20 Claims, 1 Drawing Sheet

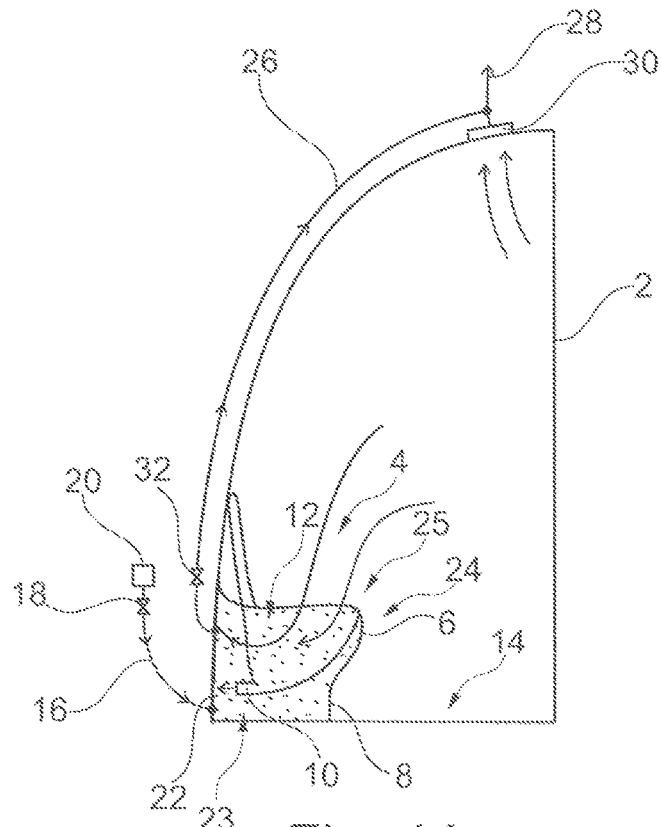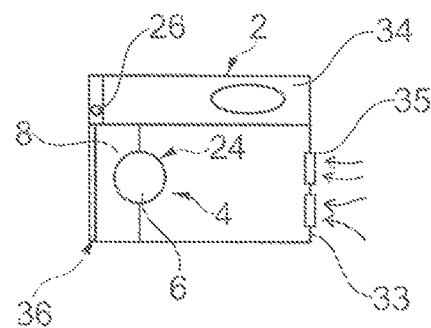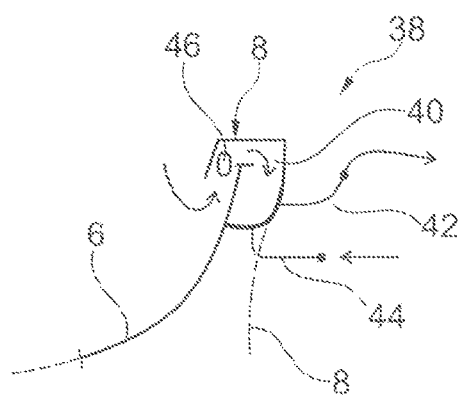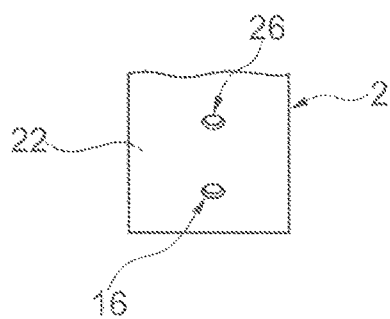
Fig. 1A
Fig. 1B
Fig. 2
Fig. 1C

TOILET SYSTEM FOR A LAVATORY OF A VEHICLE, LAVATORY OF A VEHICLE, AND AIRCRAFT WITH SUCH A LAVATORY

CROSS-REFERENCE TO RELATED APPLICATION

This application claims priority to German Patent Application No. 10 2014 117 002.4, filed Nov. 20, 2015, which is incorporated herein by reference in its entirety.

TECHNICAL FIELD

This relates to a toilet system for a lavatory of a vehicle, a lavatory of a vehicle, as well as an aircraft with such a lavatory.

BACKGROUND

In addition, other objects, desirable features and characteristics will become apparent from the subsequent summary and detailed description, and the appended claims, taken in conjunction with the accompanying drawings and this background.

Highly frequented lavatories of vehicles, and in particular of aircraft, often have a combination of a low-wear and easy-to-clean toilet bowl, which is mounted on a frame on the floor of the lavatory, as well as a cladding assembly comprised of a plastic material, which encases the toilet bowl and accompanying frame in such a way as to yield a toilet having a desired shape. A discharge of the toilet bowl situated in a lower area can be coupled with a suction line equipped with a drain valve, so as to ensure the removal of liquids and solids from the toilet bowl. Meanwhile, the cladding assembly creates an optical connection to the floor and/or a rear wall, and can function as a seat.

When using a vacuum system for removing liquids and solids from the toilet bowl, the abrupt extraction may cause particles to get into a hollow space between the cladding assembly and toilet bowl and accumulate there. Over time, this might result in odors that are noticeable in the lavatory.

DE 10 2007 061 255 A1 discloses a system for flushing a vacuum toilet in an aircraft, with a basin drain, a discharge pipe, a branch line for introducing air, a drain valve and a wastewater line.

SUMMARY

In particular in aircraft, lavatories are often ventilated by actively extracting air through one or more air outlet openings, wherein extracted air is preferably routed outside of the vehicle due to the odors that arise in the lavatory. The odors are limited via continuous extraction, wherein the noticeable odor depends on the selected air volume flow. As particles accumulate, however, it may happen that the set air volume flow will be insufficient to fully suppress all odors inside the lavatory and in its immediate vicinity. But increasing the air volume flow would not be an acceptable solution for both energy reasons and given the resultant noise.

Therefore, it is an objective to provide a device and a method with which odors in the lavatories of vehicles can be suppressed as efficiently as possible, without significantly increasing the air volume flow of a venting device required for this purpose.

Proposed is a toilet system for a lavatory of a vehicle, which comprises a toilet bowl and a cladding assembly designed to cover the toilet bowl, forming a hollow space between the toilet bowl and the cladding assembly. The cladding assembly extends from an exterior side of the toilet bowl over an edge of the toilet bowl, and in so doing partially encases the edge. The toilet system further comprises a venting device with at least one suction line for extracting air. At least one of the at least one suction line is fluidically connected with the hollow space between the cladding assembly and toilet bowl.

As a consequence, the odor suppression performed in the toilet system according to the embodiment is achievable through extraction directly where the odor arises. The hollow space inside of the cladding assembly is continuously flushed with air by the constant venting, which flows downstream toward the suction line. This ultimately makes it virtually impossible for odors to spread into the lavatory from the hollow space. Of course, not just a single hollow space must be present; rather, a second hollow space or even additional hollow spaces may be present at other locations.

The changes to a known configuration of a lavatory required for realizing the toilet system are marginal. Since a suction line for venting ("air extraction") is normally present anyway, the latter may be equipped with at least one separate branch line, for example, which extends between the cladding assembly and toilet bowl in the hollow space. At least one additional air outlet connected with the suction line may be arranged at another location of the toilet system. In prior art, air outlets are preferably located in an upper area of a lavatory, for example in its ceiling paneling. Alternatively, the entire air volume flow set for venting may be extracted from the respective hollow space, as long as it can be ensured that at least some of the air from the lavatory itself may flow into the hollow space, and the noise generated is negligible.

As a result of the cladding assembly configuration, a flow of air into the hollow space via the edge area of the toilet bowl may be achieved without having to change the required air volume flow.

As mentioned at the outset, the cladding assembly may constitute in particular a shaping structure, which spatially enhances the functional toilet bowl and a frame that bears the toilet bowl, which may be secured to a floor or wall inside the lavatory, so as to yield a complete toilet, provides a seat surface and simultaneously comprises an attractive outward appearance. Neither the cladding assembly nor the toilet bowl or general construction of the toilet system have to be modified to more than just a marginal extent to achieve the advantages.

A larger opening sometimes lying in a rearward area of the cladding assembly and/or a rear wall of the lavatory, through which extend the electric lines and fluid lines, may in one embodiment be closed flush with the lines to be routed through. This yields a rather large hollow space open in the edge area of the toilet bowl or cladding assembly inside of the cladding assembly that permits a defined flushing with air.

As will be noted further below, various additional embodiments may be realized. The latter differ from each other in particular in that various locations may be selected for air extraction.

In an advantageous embodiment, the cladding assembly comprises a rear side that is positionable flush against a wall of the lavatory, wherein a suction line from outside of the lavatory extends through the rear side of the cladding assembly and into the hollow space through a tightly sealed opening. As a result, air is extracted via the rearward end of the cladding assembly, wherein air may flow in particular over the edge area of the toilet bowl. The feature involving the tightly sealed opening must be understood to mean that all lines routed through the opening into the interior of the cladding assembly are encased in a flush manner, so that the hollow space on the rear side of the cladding assembly is largely sealed, and the air flow to be extracted is completely defined. For this purpose, a type of additional bulkhead may conceivably be arranged on a rear side of the existing toilet.

In another advantageous embodiment, the hollow space is formed in an edge area between the cladding assembly and an edge of the toilet bowl, so that air is extracted from the edge area. The edge area of a cladding assembly of a conventional toilet on an aircraft can incorporate ventilation slots that are able to at least partially compensate for a vacuum that arises while removing the substances from the toilet bowl. If a location of the edge area is connected with a suction line, air is continuously extractable from the edge area. Any ventilation slots may for this purpose be at least partially closed, so as to permit air to flow over the edge area of the toilet bowl, in which the cladding assembly at least partially encases the toilet bowl. As a consequence, the odor of contaminants that accumulate in the edge area of the toilet bowl and at the transition to the cladding assembly cannot spread in the lavatory, since the edge area is continuously flushed with flowing air from the lavatory, which flows over the toilet bowl into the edge area.

Given closed ventilation slots in the cladding assembly, which are fluidically connected with the interior of the lavatory, certain situations require the ability to quickly equalize the pressure. In an advantageous embodiment, this may be achieved by connecting an (ambient) air source of a vacuum system with the edge area. The air source may involve a bypass line (also herein before referred to as a branch line) from the vacuum system, which is equipped with an odor seal, a check valve and an optional sound absorber, and, during the removal of substances from the toilet bowl by means of the vacuum system, allows air to flow in a discharge pipe upstream from a discharge valve.

The embodiments further relate to a lavatory with such a toilet system. The suction line connected with the hollow space may here run both in a rearward area of the lavatory and in a service module situated adjacent to the toilet system.

In an advantageous embodiment, the lavatory comprises an air outlet, wherein the hollow space and the air outlet are connected with a shared suction line. The air extracted from the air outlet and hollow space may be calibrated using the usual devices, e.g., screens and the like.

The embodiments described herein further relate to a vehicle with such a lavatory, wherein the vehicle in particular is an aircraft.

BRIEF DESCRIPTION OF THE DRAWINGS

The various embodiments will hereinafter be described in conjunction with the following drawing figures, wherein like numerals denote like elements, and:

FIG. 1A shows a lateral sectional view of a lavatory with a toilet system in accordance with an embodiment.

FIG. 1B shows a top view of a lavatory in accordance with the embodiment.

FIG. 1C shows a detail view of a lavatory in accordance with the embodiment.

FIG. 2 shows a detail from an embodiment of a toilet system in accordance with the embodiment.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

FIG. 1A shows a lateral sectional view of a lavatory 2 with a toilet system 4 arranged therein, which is situated next to additional components in the lavatory 2. The toilet system 4 consists of a toilet bowl 6, a frame that bears the toilet bowl 6 and has not been shown for the sake of simplicity, as well as a cladding assembly 8, which forms the exterior shape of a toilet noticeable by a user. The toilet bowl 6 comprises a discharge 10, which is preferably situated on a lower side of the toilet bowl 6, along with an edge 12, which represents the upper boundary of the toilet bowl 6 during installation of the toilet bowl 6. The cladding assembly 8 extends from a floor 14 until over the edge 12 and partially encases the latter, thereby creating a seating surface for a user of the toilet system 4.

If necessary, the discharge 10 is connectable with a vacuum system, which comprises a discharge valve (not shown here) used to abruptly expose the discharge 10 to a vacuum, so that the liquids and solids in the toilet bowl 6 are removed through the discharge 10 to a suitable container. A suitable discharge pipe may be connected with a supply pipe 16, which allows cabin air to flow into the discharge pipe. To this end, in particular a check valve 18 may be provided, which is followed by an optional sound absorber 20, so that air is extracted from the cabin exclusively during a removal process, and the noise level arising in the process is minimized.

Consequently, a series of lines are routed out of the lavatory 2 or into the latter at the rearward end of the cladding assembly 6, so that a very large opening may often be present. According to an embodiment, a rear wall 22 of the cladding assembly 8 is designed in such a way as to form a flush seal with all lines passed through, as schematically depicted on FIG. 1C. As a result, a hollow space essentially closed to the outside comes about between the toilet bowl 6 and cladding assembly 8, to the exclusion of an edge area 22 to be described below.

Provided in a preferably continuous edge area 24 of the cladding assembly 8 is a series of openings 5, which balance out the vacuum arising in the toilet bowl 6 at least partially in the edge area, 24, so as to reduce the danger to a user seated on the edge area 24, in particular given an (improbable) actuation. In addition, no complete seal is present between the cladding assembly 6 and edge 12 of the toilet bowl 6, so that liquids and solids get into the hollow space between the cladding assembly 8 and toilet bowl 6 when abruptly exposed to the vacuum during a removal process. As a consequence, substances that produce an odor over time may accumulate therein.

A suction line 26 fluidically connected with the hollow space 23 is provided to keep the undesired odors away from the interior side of the lavatory 2. In particular, the suction line 26 may be connected with a ventilation device 28, which is here only schematically depicted. The latter may in turn be connected with an air outlet 30, which is situated in a ceiling area of the lavatory 2. The ventilation device 28 continuously extracts air from the lavatory 2, and routes it to the outside, i.e., outside of the aircraft fuselage. Given the incomplete seal between the cladding assembly 8 and toilet bowl 6 in the edge area 24, the hollow space 23 is constantly flushed with air from the lavatory 2, which is then extracted via the suction line 26. In order to prevent the reverse extraction of air from the ventilation device 28 back into the lavatory 2, a check valve 32 between the hollow space 23 and suction line 26 is highly advantageous.

FIG. 1B shows a top view of a possible arrangement of components inside of the lavatory 2. For example, the suction line may run into a service unit 34, e.g., which is positioned in a lateral area of the lavatory 2, and comprises several functional elements. Alternatively, the suction line 26 may also be situated in a rearward area 36, i.e., behind the cladding assembly 8. A door 33 lying opposite the rear side 22 may incorporate air inlets 35, which allow air to flow into the lavatory 2. This ensures a flushing of the lavatory 2.

FIG. 2 shows a detail of an edge area 38 in an alternative embodiment. Depicted here is a hollow space 40 between the cladding assembly 8 and toilet bowl 4 in the edge area 38 in proximity to a spray ring 46. Air is extracted from the edge area 38 by means of a suction line 42. The suction line 42 may be present in addition to the suction line 26 shown on FIG. 1A, so that not just the hollow space 23 underneath the toilet bowl 4 is continuously ventilated, but also the hollow space 40 in the edge area 38.

For this purpose, ventilation slots that are usually present and intended to at least partially compensate for a vacuum arising in the toilet bowl 4 when removing substances from the latter may be closed, making it possible to avoid a contamination of the lavatory by the recoil of substances into the lavatory through the ventilation slots. In order to balance out the vacuum, it may make sense to fluidically connect the supply line 16 shown on FIG. 1A as an air source with the edge area 38, for example which is hooked up to the edge area 38 by means of a branch line 44. The lines 42 and 44 can be arranged at locations of the hollow space 40 spaced as far apart from each other as possible.

In addition, let it be noted that "comprise" does not preclude any other elements or steps, and that "a" or "an" do not rule out a plurality. Let it further be noted that features described with reference to one of the above exemplary embodiments can also be used in combination with other features in other exemplary embodiments described above. Reference numbers in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A toilet system for a lavatory of a vehicle, comprising a toilet bowl,
   a cladding assembly for cladding the toilet bowl, forming a hollow space between the toilet bowl and the cladding assembly, and
   a ventilation device with at least one suction line for extracting air,
   wherein the cladding assembly extends from a floor at an exterior side of the toilet bowl over an edge of the toilet bowl, and thereby partially encases the edge, thereby creating a seating surface for directly seating a user of the toilet system, and
   wherein at least one of the at least one suction lines is fluidly connected with the hollow space.

2. The toilet system of claim 1,
   wherein the cladding assembly comprises a rear side to be positioned flush against a wall of the lavatory, and
   wherein a suction line from outside of the lavatory extends through the rear side of the cladding assembly and into the hollow space.

3. The toilet system of claim 1, wherein a selected suction line comprises a fluidic connection with an edge area of the cladding assembly comprising a hollow space, so that air is extracted from the edge area.

4. The toilet system of claim 3, wherein the edge area is further connected with an air source of a vacuum system.

5. The lavatory of claim 1, further comprising an air outlet for ventilating the lavatory, wherein the hollow space and the air outlet are connected with a shared suction line.

6. The vehicle of claim 1, wherein the vehicle is an aircraft.

7. The toilet system of claim 1 wherein the edge of the toilet bowl is an annular upper edge, and wherein the cladding assembly is located directly over the entire annular upper edge of the toilet bowl.

8. The toilet system of claim 1 wherein the edge of the toilet bowl is an annular upper edge and bounds a volume within the toilet bowl, and wherein the cladding assembly extends into the volume of the toilet bowl along the entire annular upper edge.

9. A toilet system for a lavatory of a vehicle, comprising:
   a toilet bowl;
   a cladding assembly for cladding the toilet bowl and forming a hollow space therein;
   a ventilation device;
   at least one suction line for extracting air, the suction device coupled to the ventilation device;
   wherein the cladding assembly extends from a floor at an exterior side of the toilet bowl over an edge of the toilet bowl, and thereby partially encases the edge, thereby creating a seating surface for directly seating a user of the toilet system, and
   wherein at least one of the at least one suction lines is fluidly connected with the hollow space.

10. The toilet system of claim 9, wherein the cladding assembly is positioned against a wall of the lavatory.

11. The toilet system of claim 10, wherein the suction line extends through a rear side of the cladding and into the hollow space.

12. The toilet system of claim 11, wherein the suction line comprises at least one suction line that comprises a fluid coupling to an edge area of the cladding.

13. The toilet system of claim 12, wherein the cladding assembly comprises a hollow space to extract air from the edge area.

14. The toilet system of claim 12 wherein the edge area is coupled with an air source of a vacuum system.

15. The toilet system of claim 9 wherein the edge of the toilet bowl is an annular upper edge, and wherein the cladding assembly is located directly over the entire annular upper edge of the toilet bowl.

16. The toilet system of claim 9 wherein the edge of the toilet bowl is an annular upper edge and bounds a volume within the toilet bowl, and wherein the cladding assembly extends into the volume of the toilet bowl along the entire annular upper edge.

17. A lavatory system for a vehicle, comprising:
   a toilet system including a toilet bowl;
   a cladding assembly for cladding the toilet bowl and forming a hollow space therein;
   a ventilation device;

at least one suction line for extracting air, the suction device coupled to the ventilation device;

wherein the cladding assembly extends from a floor at an exterior side of the toilet bowl over an edge of the toilet bowl, and thereby partially encases the edge, thereby creating a seating surface for directly seating a user of the toilet system, and wherein at least one of the at least one suction lines is fluidly connected with the hollow space.

18. The lavatory of claim 17, further comprising an air outlet for ventilating the lavatory, wherein the hollow space and the air outlet are coupled with a shared support line.

19. The lavatory system of claim 17 wherein the edge of the toilet bowl is an annular upper edge, and wherein the cladding assembly is located directly over the entire annular upper edge of the toilet bowl.

20. The lavatory system of claim 17 wherein the edge of the toilet bowl is an annular upper edge and bounds a volume within the toilet bowl, and wherein the cladding assembly extends into the volume of the toilet bowl along the entire annular upper edge.

\* \* \* \* \*